United States Patent
Li et al.

(10) Patent No.: US 9,668,230 B2
(45) Date of Patent: May 30, 2017

(54) SECURITY INTEGRATION BETWEEN A WIRELESS AND A WIRED NETWORK USING A WIRELESS GATEWAY PROXY

(75) Inventors: Gordon Yong Li, San Diego, CA (US); Victor T. Hou, La Jolla, CA (US); Xuemin Chen, Rancho Santa Fe, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 641 days.

(21) Appl. No.: 12/943,428

(22) Filed: Nov. 10, 2010

(65) Prior Publication Data

US 2011/0113250 A1 May 12, 2011

Related U.S. Application Data

(60) Provisional application No. 61/259,911, filed on Nov. 10, 2009.

(51) Int. Cl.
| | |
|---|---|
| *H04K 1/00* | (2006.01) |
| *H04W 56/00* | (2009.01) |
| *H04L 12/857* | (2013.01) |
| *H04W 28/24* | (2009.01) |
| *H04L 29/06* | (2006.01) |

(Continued)

(52) U.S. Cl.
CPC ......... *H04W 56/00* (2013.01); *H04L 47/2491* (2013.01); *H04W 28/24* (2013.01); *H04L 9/0861* (2013.01); *H04L 9/32* (2013.01); *H04L 9/321* (2013.01); *H04L 9/3202* (2013.01); *H04L 41/0213* (2013.01); *H04L 41/0816* (2013.01); *H04L 47/14* (2013.01); *H04L 47/2408* (2013.01); *H04L 47/2425* (2013.01);

(Continued)

(58) Field of Classification Search
CPC .... H04W 12/06; H04L 63/08; H04L 63/0428; H04L 63/04; H04L 9/32; H04L 9/3202; H04L 9/321; H04L 9/0861
USPC ....... 380/270, 44; 713/155, 169, 171; 726/2, 726/5, 6, 7, 12, 19
See application file for complete search history.

(56) References Cited

U.S. PATENT DOCUMENTS

| | | | |
|---|---|---|---|
| 6,766,453 B1 * | 7/2004 | Nessett et al. | 713/171 |
| 7,292,592 B2 * | 11/2007 | Rune | 370/401 |

(Continued)

*Primary Examiner* — Liangche A Wang
*Assistant Examiner* — Johnny Aguiar
(74) *Attorney, Agent, or Firm* — Sterne, Kessler, Goldstein & Fox PLLC

(57) ABSTRACT

A method, system and computer program product in a wireless gateway to provide secured communications over a wireless network and a wired network is provided herein. The method includes the steps of receiving a first authentication credential from a wireless device and mapping the first authentication credential to a second authentication credential. The method further includes transmitting the second authentication credential to an authentication server and receiving a first authentication response from the authentication server. The method also includes generating a first shared secret and a second shared secret if the first authentication response indicates that authentication is successful and transmitting a second authentication response to the wireless device. The first shared secret is used to setup a first secured channel for communications with a service provider over a wired network and the second shared secret is used to setup a second secured channel for communications with the wireless device.

14 Claims, 5 Drawing Sheets

(51) Int. Cl.
  *H04W 12/06* (2009.01)
  *H04L 9/08* (2006.01)
  *H04L 9/32* (2006.01)
  *H04L 12/24* (2006.01)
  *H04L 12/801* (2013.01)
  *H04L 12/851* (2013.01)

(52) U.S. Cl.
  CPC .......... *H04L 63/04* (2013.01); *H04L 63/0428* (2013.01); *H04L 63/08* (2013.01); *H04W 12/06* (2013.01)

(56) References Cited

U.S. PATENT DOCUMENTS

| | | | |
|---|---|---|---|
| 7,296,078 B2 * | 11/2007 | Sanchez Herrero et al. | 709/229 |
| 7,512,969 B2 * | 3/2009 | Gould et al. | 726/4 |
| 7,716,723 B1 * | 5/2010 | Taylor et al. | 726/7 |
| 8,091,121 B2 * | 1/2012 | Lioy | 726/5 |
| 8,145,905 B2 * | 3/2012 | Patwardhan et al. | 713/168 |
| 8,225,092 B2 * | 7/2012 | Lal et al. | 713/168 |
| 2001/0037453 A1 * | 11/2001 | Mitty et al. | 713/168 |
| 2004/0117623 A1 * | 6/2004 | Kalogridis et al. | 713/165 |
| 2007/0079368 A1 * | 4/2007 | Takeyoshi et al. | 726/15 |
| 2007/0124471 A1 * | 5/2007 | Harada et al. | 709/225 |
| 2007/0140195 A1 * | 6/2007 | Kaftan | 370/338 |
| 2008/0040606 A1 * | 2/2008 | Narayanan et al. | 713/169 |
| 2008/0177997 A1 * | 7/2008 | Morais et al. | 713/153 |
| 2008/0225749 A1 * | 9/2008 | Peng et al. | 370/254 |
| 2009/0319771 A1 * | 12/2009 | Nagaraja | 713/151 |
| 2010/0031029 A1 * | 2/2010 | Ilyadis | 713/156 |
| 2010/0217837 A1 * | 8/2010 | Ansari et al. | 709/218 |

\* cited by examiner ably pointed out to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

SECURITY INTEGRATION BETWEEN A WIRELESS AND A WIRED NETWORK USING A WIRELESS GATEWAY PROXY

CROSS REFERENCE TO RELATED APPLICATIONS

This application claims the benefit of U.S. Provisional Application No. 61/259,911 filed Nov. 10, 2009, which is incorporated herein by reference in its entirety.

BACKGROUND OF THE INVENTION

Field of the Invention

This invention is generally related to security integration between a wireless and a wired network.

Background Art

In conventional communication systems, a wireless device requesting the use of a particular service (e.g. a PacketCable™ service) from a service provider over a wireless network has to first authenticate itself for use of the wireless network and then authenticate itself for use of the PacketCable service over the wireless network. This conventional method of authentication is time consuming because wireless service authentication and PacketCable service authentication have to be performed serially. Also, a wireless authentication server is required for the wireless service authentication in addition to an authentication server for PacketCable service authentication which results in additional hardware overhead. Lastly, both wireless service authentication and PacketCable service authentication have to be performed by a wireless device thereby occupying computational resources on the wireless device.

Methods, systems and computer program products are needed to overcome the above mentioned deficiencies.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

Figure 1:
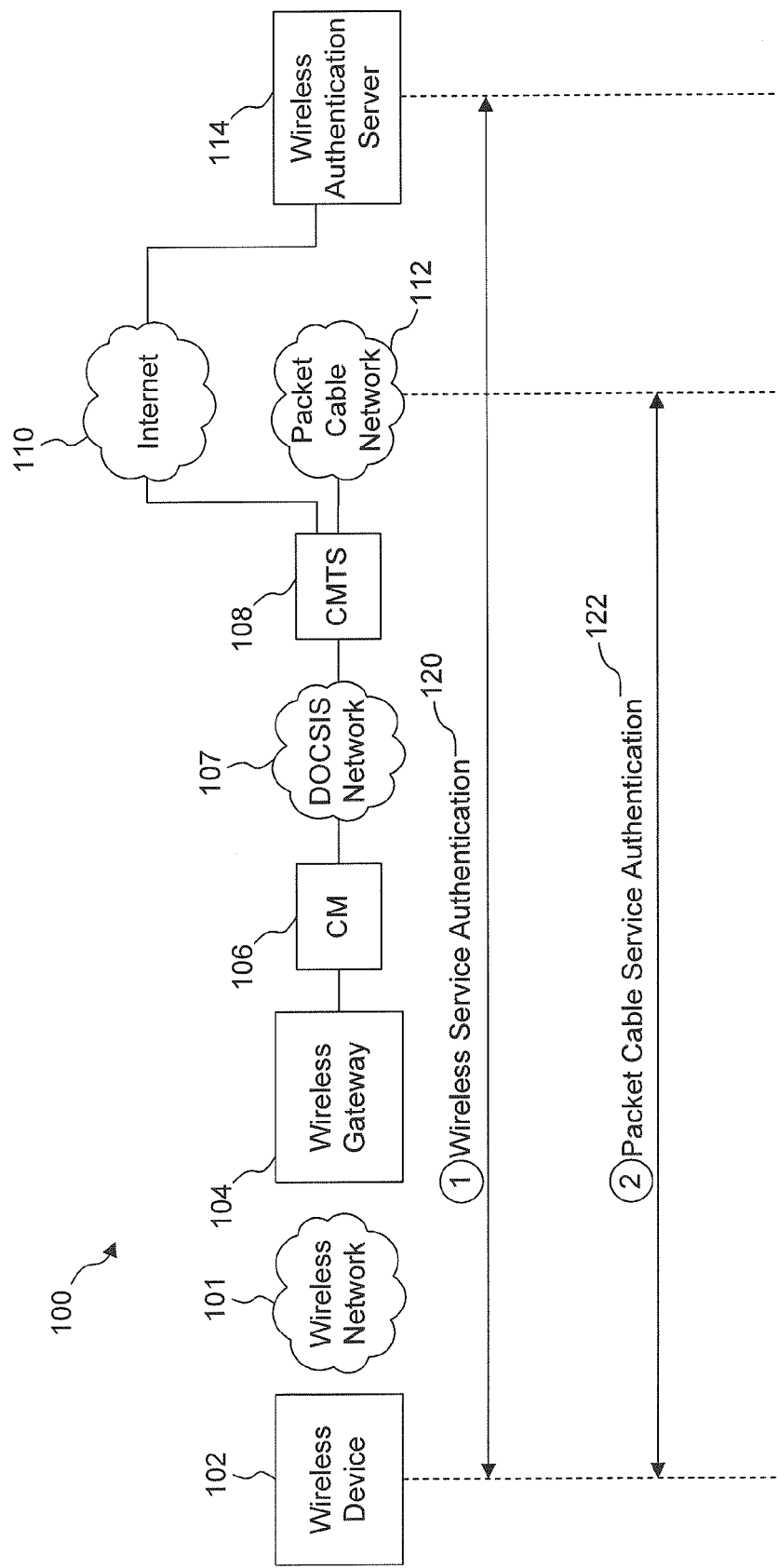
FIG. 1 illustrates an example communication system.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

FIG. 1 illustrates an example communication system 100. System 100 includes: wireless device 102, wireless gateway 104, cable modem 106, cable modem termination system (CMTS) 108, PacketCable network 112 and wireless authentication server 114. Wireless device 102 communicates with wireless gateway 104 over wireless network 101. Cable modem 106 communicates with CMTS 108 over wired network 107. Wireless device 102 communicates with PacketCable network 122 over wireless network 101 and wired network 107. Wireless device 102 communicates with wireless authentication server 114 over wireless network 101 and over internet 110.

A "wireless device" as described herein refers to a device that can communicate wirelessly with other devices i.e. without using tangible physical media such as coaxial cables, twisted pair Ethernet cables, optical fibers etc. For example, wireless device 102 is any device that can communicate wirelessly over wirelessly over wireless network 101. In an example, wireless device 102 may be referred to as a WiFi station (WiFi STA or simply STA). Wireless device 102 may be, for example, any wireless device including but not limited to a cellular phone such as an iPhone™, a wireless laptop or any device enabled to communicate over wireless network 101.

A "wireless network" as referred to herein may refer to any network that transmits and receives data between two or more devices without using physical media such as wires or cables. In an example, wireless network 101 is based on Institute of Electrical and Electronics Engineers (IEEE) 802.11 protocol for wireless communication networks. In another example, wireless network 101 may be referred to as a Wireless Local Area Network (WLAN) or a WiFi network.

Cable modem 106 communicates with cable modem termination 108 using a Data Over Cable Service Interface Specification (DOCSIS) protocol. Cable modem 106 and CMTS 108 are both referred to as "wired devices" herein. A "wired device" as described herein refers to a device that communicates using tangible physical media including but not limited to coaxial cables, twisted pair Ethernet cables, optical fibers etc. Cable modem 106 may communicate with wireless gateway 104 using Ethernet packets over an Ethernet network.

Wireless gateway 104 is both a wired device and a wireless device. Wireless gateway 104 can transmit and receive data both wirelessly and through wires. For example, wireless gateway 104 can communicate with wireless device 102 and can also communicate with cable modem 106. Wireless gateway 104 can communicate with wireless device 102 using 802.11 frames or packets over wireless network 101. Wireless gateway 104 can also communicate with CMTS 108 via cable modem 106 over Ethernet cables in an Ethernet network and over wired network 107. Thus, the wireless gateway 104 serves as a conduit that bridges wireless network 101 and wired network 107. Wireless gateway 104, may also be referred to as a wireless access point (AP), a radio or a "wireless hotspot." In the example in FIG. 1, wireless gateway 104 and cable modem 106 are physically separate, standalone devices with wireless gateway 104 being coupled to cable modem 106 via an Ethernet cable. Wireless gateway 104 sends data encapsulated in Ethernet packets to cable modem 106. Cable modem 106 may encapsulate or convert the Ethernet packets into a DOCSIS format and transmit them to CMTS 108 for further transmission over another network such as the Internet. Thus, data is transmitted from a wireless device 102 over wireless network 101 to wireless gateway 104 and from wireless gateway 104 and cable modem 106 over wired network 107 to CMTS 108.

A "wireless service" as referred to herein refers to the use of wireless network 101 by wireless device 102 for communications. Wireless device 102 may have to be authenticated to use the wireless service before wireless device 102 can use wireless network 101 to access, for example, internet 110. In an example, a wireless service may be authenticated by a wireless authentication server 114. In an example, the wireless service is a WiFi™ service. The authentication of wireless device 102 to use wireless network 101 is referred to as "wireless service authentication" herein. Wireless device 102 may also use a "PacketCable service," for example, a multimedia or a real-time service such as that provided by a PacketCable network 112 (also referred to as "PacketCable™ network"). For example, if wireless device 102 wants to use a Voice over IP (VoIP) service, then wireless device 102 has to authenticate itself to PacketCable network 112 in order to use the VoIP service. In the examples presented herein, the PacketCable services are provided by PacketCable network 112. However, it is to be appreciated that any type of network may be used to provide the services. PacketCable network 112 or any network providing services to wireless device 102 may be may be referred to as a "service provider" herein. It is also to be appreciated that the PacketCable service may be any type of service requested by wireless device 102, including but not limited to, VoIP, real-time, pre-stored or streaming multimedia, an on-demand video game service etc. PacketCable service may also be referred to as a media service or multimedia service. It is to be appreciated that a PacketCable service differs from a wireless service in that PacketCable service is related to a service that provides media or enables services such as VoIP applications. In contrast, a wireless service as referred to herein is related to the access of a wireless network, for example, wireless network 101. Another network, such as the internet 110 or PacketCable network 112 may be accessed through the wireless network 101. "Communications" between devices as referred to herein include, but are not limited to, any type of packet, frame, message or data exchanged between devices.

In conventional systems, in order for a wireless device 102 to use a specific service on PacketCable network 112, wireless device 102 has to first authenticate itself with wireless authentication server 114 using wireless service authentication 120. Wireless service authentication 120 may occur over internet 110. If wireless service authentication 120 is successful, then wireless device 102 has to authenticate itself to PacketCable network 112 using PacketCable service authentication 122. If both wireless service authentication 120 and PacketCable service authentication 122 are successful, then wireless device 102 is allowed to use a service on PacketCable network 112 that it was authenticated for, for example, a VoIP service. As seen in FIG. 1, the conventional method of authenticating wireless device 102 for a wireless service as well as a PacketCable service is time consuming because wireless service authentication 120 and PacketCable service authentication 122 have to be performed serially. Furthermore, wireless authentication server 114 is required for the wireless service authentication which results in additional hardware overhead. Furthermore, both wireless service authentication 120 and PacketCable service authentication 122 have to be performed by wireless device 102 thereby occupying computational resources on wireless device 102 as well.

Embodiments presented herein provide a solution that removes the burden for authentication for both wireless service and PacketCable service from wireless device 102 by using wireless gateway 104 as an authentication proxy.

The embodiments presented herein also reduce infrastructure requirements by eliminating the need for wireless authentication server 114. Furthermore, the present embodiments allow for simultaneous authentication of a PacketCable service and a wireless service thereby significantly speeding up the authentication process to use a PacketCable service.

Figure 2:
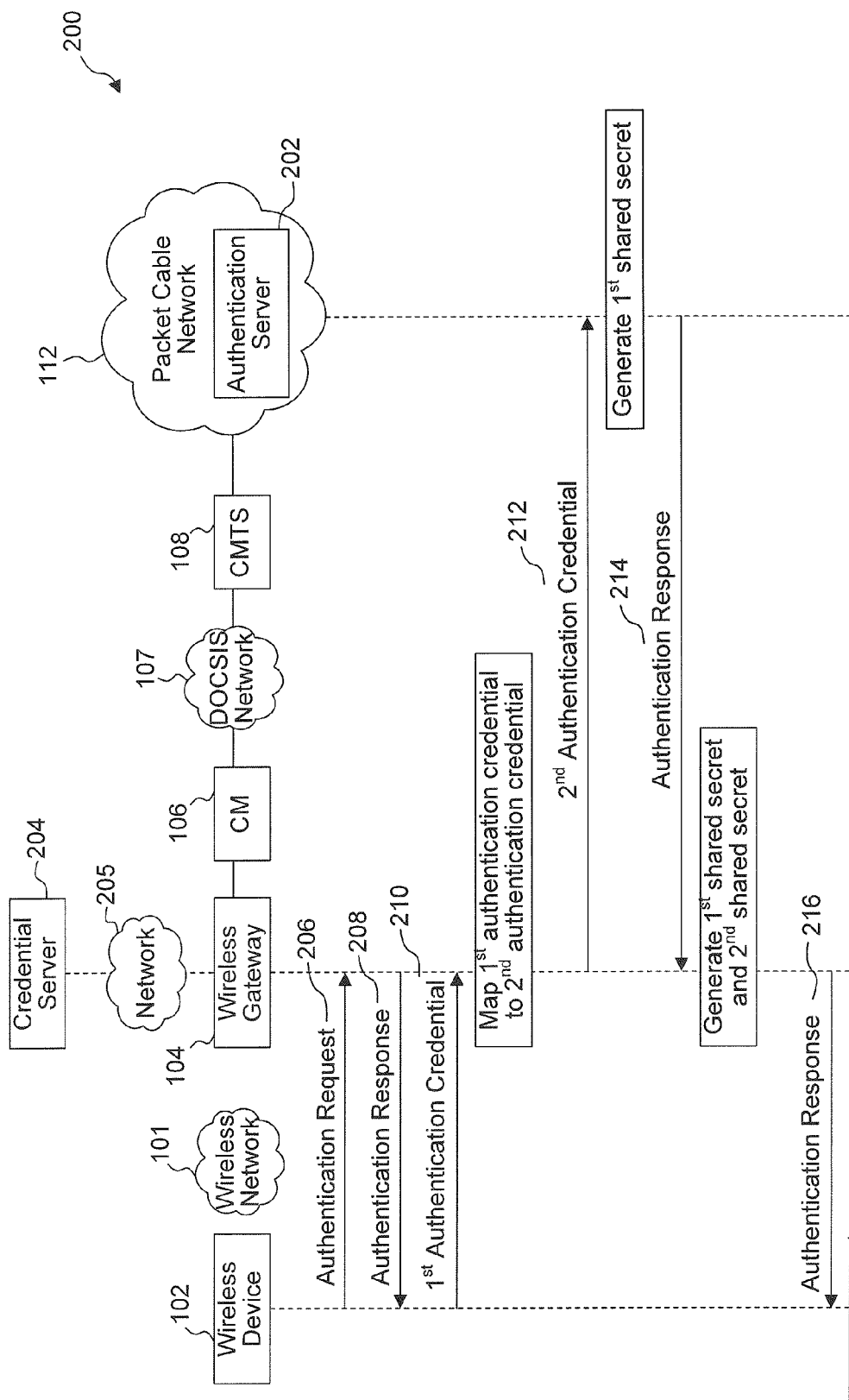
FIG. 2 illustrates an example authentication system to authenticate a wireless device for both a wireless service and a PacketCable service according to an embodiment of the invention.

FIG. 2 illustrates an example authentication system 200 to authenticate a wireless device 102 for a wireless service and a PacketCable service according to an embodiment of the invention. In FIG. 2, wireless device 102 is coupled to wireless gateway 104 via wireless network 101. Wireless gateway 104 is coupled to cable modem 106 via Ethernet. Wireless gateway 104 may be coupled to a credential server 204 via network 205 which may be a wired or a wireless network. Cable modem 106 is coupled to CMTS 108 via DOCSIS network 107. CMTS 108 is coupled to PacketCable network 112. PacketCable network 112 includes an authentication server 202.

According to an embodiment of the invention, wireless gateway 104 serves as a transparent authentication proxy for wireless device 102 for wireless service as well as PacketCable service authentication. The use of wireless device 102 as a transparent authentication proxy makes it appear to PacketCable network 112 and authentication server 202 as if wireless device 102 is performing the authentication instead of wireless gateway 102. Furthermore, using wireless device 102 as a transparent authentication proxy makes it appear to wireless device 102 as if wireless device 102 is performing the authentication for both a wireless service and a PacketCable service. Also, according to an embodiment of the invention, wireless service authentication which was conventionally performed by wireless authentication server 114 is now performed by authentication server 202. Thus the need for wireless authentication server 114 is eliminated resulting in significant cost savings.

To authenticate a wireless service and a PacketCable service, wireless device 102 first authenticates wireless gateway 104 to determine whether wireless gateway 104 is secure. For example, wireless device 102 transmits an authentication request 206 to wireless gateway 104. Authentication request 206 may be, for example, an Extensible Authentication Protocol (EAP) request. Upon receiving authentication request 202 from wireless device 102, wireless gateway 104 sends an authentication response 208 to wireless device 102. Authentication response 208 may be, for example an EAP response.

If authentication of wireless gateway 104 is successful, then wireless device 102 transmits a first authentication credential 210 to wireless gateway 104. The authentication credential may be cryptographic data, for example, a digital certificate along with signature. The signature may be a random number that is signed by a private key associated with the digital certificate. In another example, the authentication credential may be a login name along with a keyed hash value that is generated using a password associated with the login name. Wireless gateway 104 maps the first authentication credential 210 sent by wireless device 102 to a second authentication credential 212 that can authenticate wireless device 102 for both a wireless service and a PacketCable service. It is a feature of the embodiments presented herein that second authentication credential 212 can authenticate wireless device 102 simultaneously for both a wireless service and a PacketCable service as opposed to conventional systems where separate authentication credentials have to be submitted in serial for wireless service authentication followed by PacketCable service authentication. In an embodiment, wireless gateway 104 retrieves the second authentication credential 212 corresponding to the first authentication credential 210 from credential server 204. Credential server 204 may be remote to the wireless gateway and may be accessed via network 205 which may be a wired or a wireless network. In another example, credential server 204 may be local to wireless gateway 104 i.e. it may be accessed via a local network such as an Ethernet network. In an example, credential server 204 may be accessed over internet 110. In yet another example, credential server 204 may be part of wireless gateway 104.

Wireless gateway 104 transmits the second authentication credential 212 to authentication server 202. If authentication of second authentication credential 212 by authentication server 202 is successful, then authentication server 202 generates a first shared secret based on the second authentication credential 212. For example, authentication server 202 may generate a first shared secret using the second authentication credential 212, a first randomly-generated number referred to as a "nonce", and pre-configured confidential data such as private key or password. In another example, the first shared secret may be generated using second authentication credential 212, pre-configured confidential data such as private key or password, and other data such as device identities and time stamps.

A shared secret is data only known to the parties involved in a secure communication. The shared secret may be inputted into a key derivation function to produce one or more keys for encryption/decryption of messages. In an example, the first shared secret may be used by authentication server 202 to generate a first session key that is used to encrypt or decrypt communications with wireless gateway 104 over DOCSIS network 107 and thereby create a secure channel with wireless gateway 104.

Authentication server 202 transmits an authentication response 214 to wireless gateway 104 indicating whether authentication of the wireless service and a PacketCable service for wireless device 102 using authentication credential 212 was successful.

If authentication was not successful, then wireless gateway 104 sends an authentication response 216 to wireless device 104 indicating failure of authentication.

If authentication was successful, then wireless gateway 104 also generates the first shared secret. Wireless gateway 104 may generate the first shared secret based on the second authentication credential 212. For example, wireless gateway 104 generates the first shared secret using the second authentication credential 212, the first randomly-generated nonce, and confidential data such as private key or password obtained from the credential server 204. In an example, the authentication server 202 sends the first nonce in authentication response 214. In another example, the first nonce may be generated in wireless gateway 104 and sent to the authentication server 202 in the second authentication credential 212. Wireless gateway 104 also generates a second secret. In an example, the second shared secret may be generated based on the first shared secret. In another example, the second shared secret may be generated using the first authentication credential 210, a second nonce, and confidential data such as private key or password obtained from the credential server 204. In an example, the second nonce may be generated in wireless device 102 and sent to the wireless gateway 104 as part of the first authentication credential 210. In another example, the second nonce may be generated by the wireless gateway 104 and sent to the wireless device 102 in the authentication response 216 if the second nonce is not received from the wireless device 102 as part of the first authentication credential 210. Wireless gateway 104 uses the first shared secret to generate the first session key. The first session key is used to encrypt or decrypt communications with PacketCable network 112. Wireless gateway 104 also generates a second session key using the second shared secret. The second session key is used to encrypt or decrypt communications with wireless device 102 over wireless network 101 thereby creating a secure channel with wireless device 102. In an example, the second shared secret may be referred to in 802.11(e) networks as a "master key."

If authentication response 214 indicates successful authentication with authentication server 202, then wireless gateway 104 sends an authentication response 216 to wireless device 102 indicating that authentication was successful with authentication server 202. If authentication was successful, then wireless device 102 also generates the second shared secret. Wireless device 102 may generate the second shared secret based on first authentication credential 210, the second nonce, and confidential data such as a private key or a password that is stored locally. Wireless device 102 uses second shared secret to generate the second session key which is used to encrypt or decrypt communications with wireless gateway 104 over wireless network 101 and thereby create a secure channel with wireless gateway 104.

After successful authentication and generation of keys, wireless gateway 104 also serves as a security proxy to encrypt or decrypt communications between wireless device 102 and PacketCable network 112. For example, wireless gateway 104 decrypts communications received from wireless device 102 destined for PacketCable network 112 using the second session key. Wireless gateway 104 then re-encrypts the decrypted communications using the first session key and transmits the re-encrypted communications to PacketCable network 112. Similarly, wireless gateway 104 decrypts communications received from PacketCable network 112 destined for wireless device 102 using the first session key. Wireless gateway 104 then re-encrypts the decrypted communications using the second session key and transmits the re-encrypted communications to wireless device 102. Thus the embodiments presented herein utilize wireless gateway 104 as a security proxy to provide seamless authentication followed by seamless encryption/decryption of communications over wireless network 101 and over wired network 107.

Figure 3:
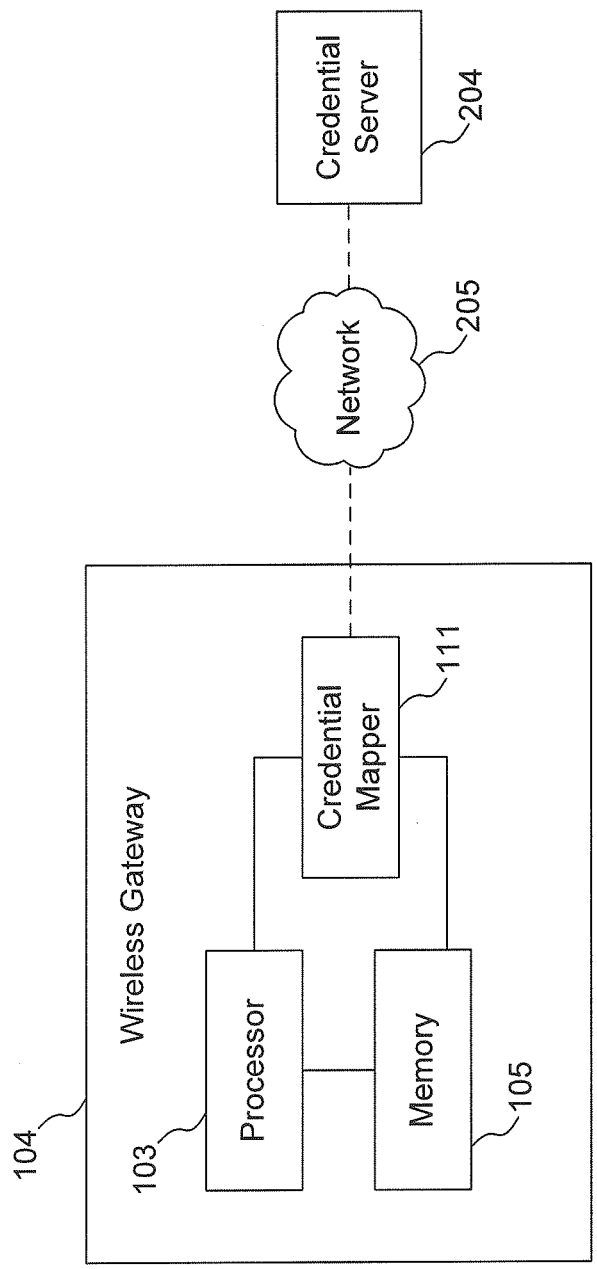
FIG. 3 illustrates a wireless gateway according to an embodiment of the invention.

FIG. 3 illustrates wireless gateway 104 according to an embodiment of the invention. Wireless gateway 104 includes a processor 103 coupled to a memory 105 and a credential mapper 111 coupled to processor 103 and memory 105. Credential mapper 111 may be used to map the first authentication credential 210 received from wireless device 102 to the second authentication credential 212 that is used to authenticate wireless device 102 for both a wireless service and a PacketCable service as described above with respect to FIG. 2. Credential mapper 111, in an example, may map the first authentication credential to the second authentication credential based on a mapping table stored in memory 105. In another example, credential mapper may access credential server 204 over network 205 to retrieve the mapped second authentication credential 212 as described above. In an example, credential mapper 111 may be used to perform all the functions of wireless gateway 104 described herein. Credential mapper 111 may be implemented in software and may run on processor 103 based on instructions stored in memory 105. In another example, credential mapper 111 may be implemented solely in hardware to allow for faster processing times.

Figure 4:
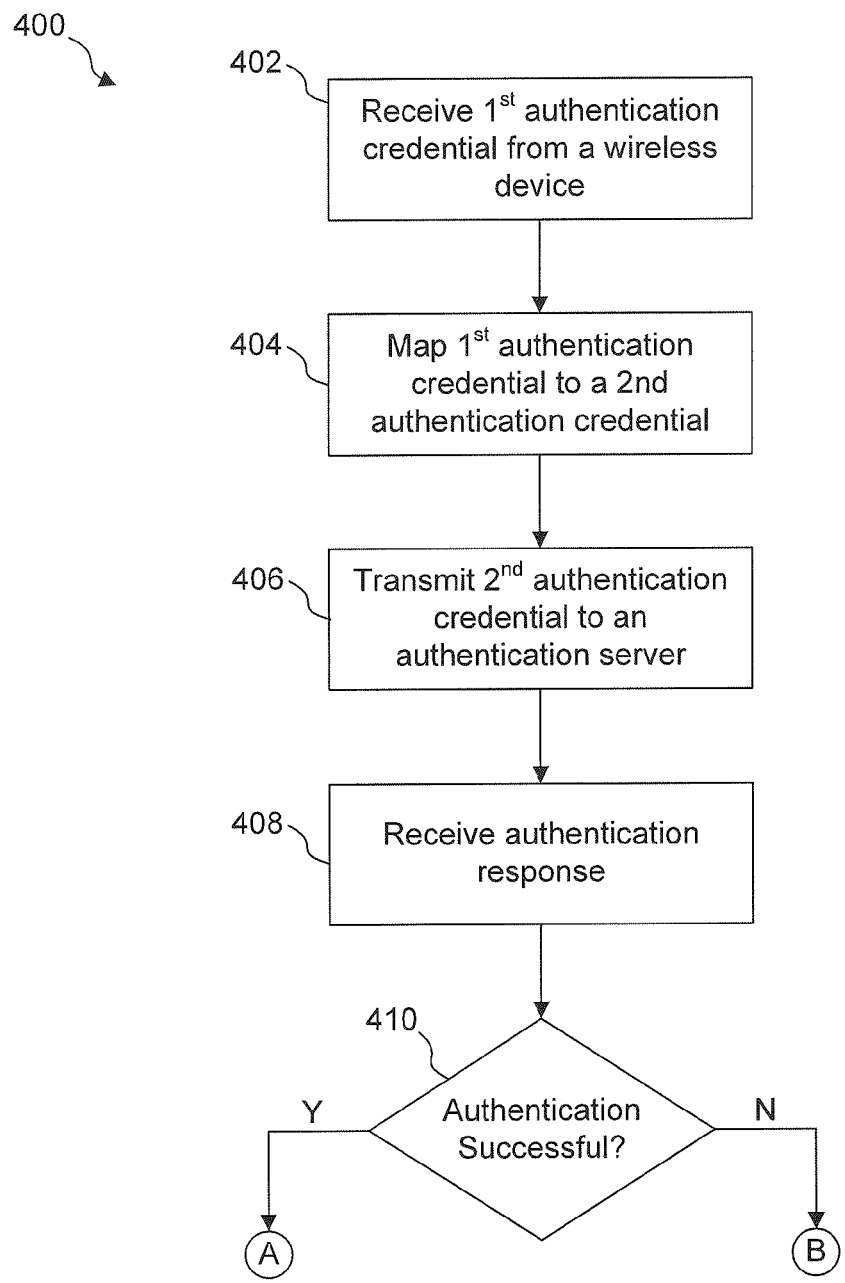
FIG. 4 illustrates an example flowchart illustrating steps performed to authenticate a wireless device for both a wireless service and a PacketCable service according to an embodiment of the invention.
Figure 4:
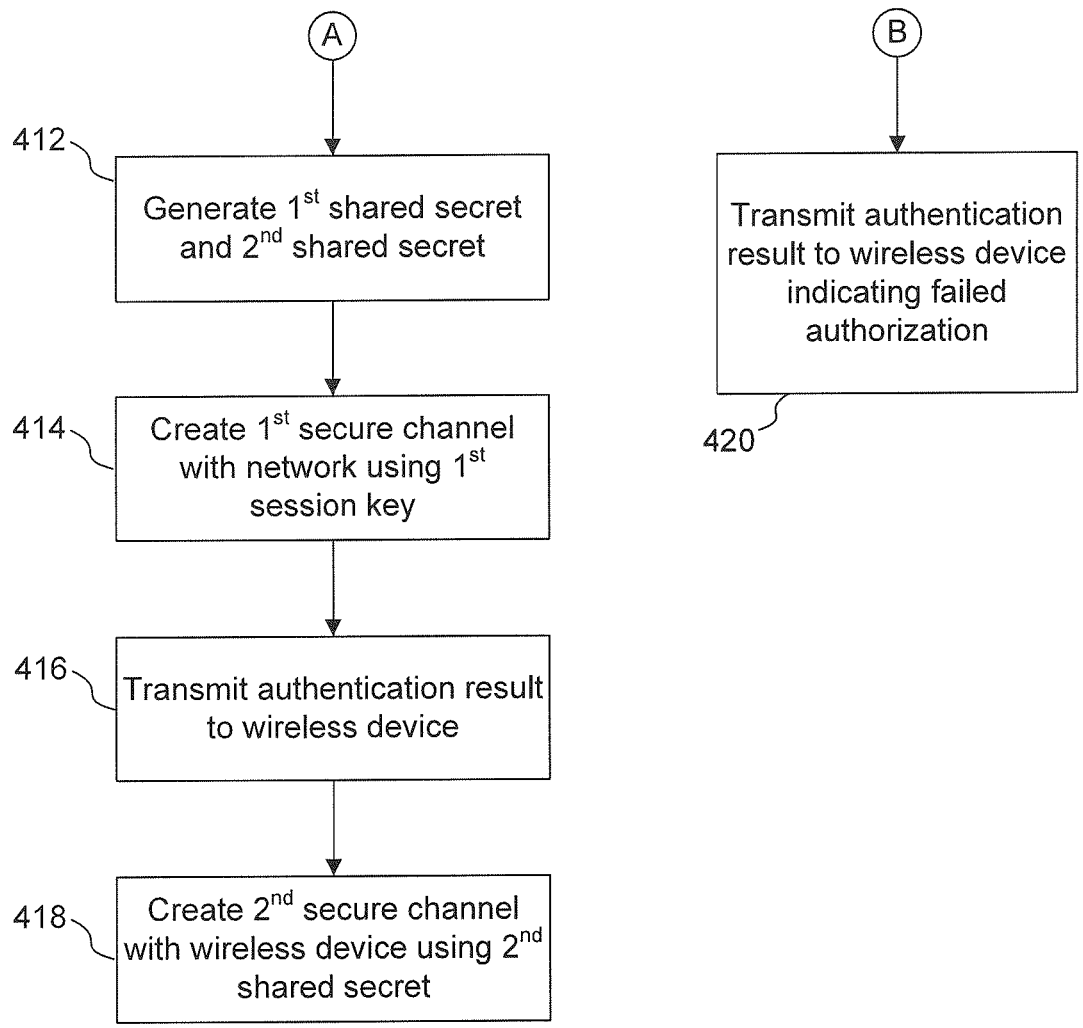

FIG. 4 illustrates an example flowchart 400 illustrating steps performed to authenticate a wireless device 102 to a wireless service and a PacketCable service according to an embodiment of the invention. Flowchart 400 will be described with continued reference to the example operating environment depicted in FIGS. 1-3. However, the flowchart is not limited to these embodiments. Note that some steps shown in flowchart 400 do not necessarily have to occur in the order shown. The steps in flowchart 400 may be performed, for example, by wireless gateway 104, or one of processor 103 and/or credential mapper 111 in wireless gateway 104.

In step 402, a first authentication credential is received from a wireless device. For example, first authentication credential 210 is received from wireless device 102.

In step 404, the first authentication credential is mapped to a second authentication credential. For example, credential mapper 111, in wireless gateway 104, maps first authentication credential 210 to a second authentication credential 212. In an example, the second authentication credential 212 is retrieved from credential server 204.

In step 406, the second authentication credential is transmitted to an authentication server. For example, wireless gateway 104 transmits second authentication credential 212 to authentication server 202.

In step 408, an authentication result is received from the authentication server. For example, authentication response 214 is received from authentication server 202.

In step 410, it is determined whether authentication was successful based on the authentication response received in step 408. If authentication is successful, then the process proceeds to step 412. If authentication is not successful then the process proceeds to step 420. In step 420, an authentication response is transmitted to the wireless device 102 indicating that authentication has failed. In an example, PacketCable service authentication may be successful but a wireless service authentication may fail. In another example, a wireless service authentication may be successful but the PacketCable service authentication may fail. In another example, both the wireless service and the PacketCable service authentication may fail.

If it is determined in step 410 that authentication is successful, then the process proceeds to step 412. In step 412, a first shared secret and a second shared secret are generated. For example, wireless gateway 104 using processor 103 generates a first shared secret and a second shared secret. First shared secret may be generated using the second authentication credential 212, the first randomly-generated nonce, and confidential data such as private key or password obtained from the credential server 204. The second shared secret may be generated using the first shared secret. The second shared secret may also be generated using the first authentication credential 210, a second randomly-generated nonce, and confidential data such as a private key or a password obtained, for example, from the credential server 204

In step 414, a first session key is used to create the first secure channel. In an example, the first session key is generated using the first shared secret. The first session key is used to encrypt or decrypt communications with PacketCable network 112.

In step 416, an authentication result is transmitted to a wireless device indicating whether authentication was successful or not. In an example, the authentication result may include the second nonce.

In step 418, a second secure channel is created. For example, a second session key may be generated using the second shared secret. The second secure channel is created using the second session key to encrypt or decrypt communications with wireless device 102.

It is to be appreciated that the examples presented herein to generate credentials, shared secrets, session keys and nonces are examples and that other means to authenticate may be used as well. For example, persons of skill in the art may use one or more of, or any combination of, user identification and password combinations, public/private keys, symmetric/asymmetric keys, Data Encryption Standard (DES), Advanced Encryption Standard (AES), SHA authentication etc. to perform the various authentications described herein. The nonces, shared secrets, authentication credentials, session keys etc, may be generated using, for example, cryptographic engines, random number generators etc as is understood by persons of skill in the art. It is to be appreciated that the means to generate the nonces, shared secrets, authentication credentials, session keys etc, are a design choice and may be arbitrary.

In an example embodiment, wireless gateway 104 and cable modem 106 may be combined into a single physical unit which may be referred to as a "wireless gateway and cable modem" (not shown). In an example, the combined wireless gateway and cable mode may operate using a single processor that is configured to perform the functions of both wireless gateway 104 and cable modem 106. Alternatively, the combined wireless gateway and cable modem may be a single physical device that includes multiple processors with a first processor implementing a functionality of wireless gateway 104 and a second processor implementing functionality of cable modem 106. It is to be appreciated that the combined wireless gateway and cable modem also implements the functions performed by wireless gateway 104 as described herein.

Embodiments presented herein, or portions thereof, can be implemented in hardware, firmware, software, and/or combinations thereof. The embodiments presented herein apply to any communication system that uses authentication procedures for any type of service.

The representative functions described herein (e.g. functions performed by processor 103 and credential mapper 111 in wireless gateway 104), wireless device 102 and authentication server 202 can be implemented in hardware, software, or some combination thereof. For instance, the method of flowchart 400 can be implemented using computer processors, such as processor 103, credential mapper 111, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the processing functions described herein could be embodied by computer program instructions that are executed by a computer processor, for example processor 103, or any one of the hardware devices listed above. The computer program instructions cause the processor to perform the instructions described herein. The computer program instructions (e.g. software) can be stored in a computer usable medium, computer program medium, or any storage medium that can be accessed by a computer or processor. Such media include a memory device, such as memory 105, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method in a wireless gateway to provide secured communications over a wireless network and a wired network, comprising:
   receiving a first authentication credential from a wireless device;
   mapping the first authentication credential to a second authentication credential;
   transmitting the second authentication credential to an authentication server;
   receiving a first authentication response from the authentication server;
   generating a first shared secret and a second shared secret if the first authentication response indicates that authentication is successful; and
   transmitting a second authentication response to the wireless device;
   wherein the first shared secret is used to set up a first secure channel for communications with a service provider over a wired network and the second shared secret is used to set up a second secure channel for communications with the wireless device.

2. The method of claim 1, further comprising:
   decrypting a message received from the service provider to generate a decrypted message using a first session key that is generated using the first shared secret;
   encrypting the decrypted message to generate an encrypted message using a second session key that is generated using the second shared secret; and
   transmitting the encrypted message to the wireless device.

3. The method of claim 1, the generating comprising:
   generating a first nonce or receiving a first nonce from the authentication server if the second authentication credential is verified by the authentication server; and
   generating the first shared secret using the first nonce, the second authentication credential, and confidential data from a credential server;
   wherein the first shared secret is used to generate a first session key used to encrypt or decrypt communications with the service provider.

4. The method of claim 3, further comprising:
   generating a second nonce or using a second nonce received from the wireless device; and
   generating the second shared secret based on the first shared secret;
   wherein the second shared secret is used to generate a second session key used to encrypt or decrypt communications with the wireless device; and
   transmitting the second nonce to the wireless device if the second nonce is not received from the wireless device in the first authentication credential.

5. The method of claim 4, wherein one or more of the second nonce, the first authentication credential, and the confidential data are used by the wireless device to generate the second shared secret.

6. The method of claim 1, prior to the receiving the first authentication credential, comprising:
   receiving an authentication request from the wireless device; and
   transmitting an authentication response to the wireless device;
   wherein the authentication request from the wireless device is an Extensible Authentication Protocol (EAP) request and the authentication response is an EAP response.

7. The method of claim 1, wherein the service provider is a PacketCable™ network, the authentication server is in the PacketCable™ network and is configured to authenticate the wireless device for both a PacketCable™ service and a WiFi™ service based on the second authentication credential.

8. The method of claim 1, wherein the first authentication credential is mapped to a second authentication credential using a credential server that is local to the wireless gateway or is remote to the wireless gateway and is accessed via the Internet.

9. The method of claim 1, wherein the second authentication credential is used by the authentication server to generate the first shared secret.

10. The method of claim 1, wherein the first shared secret and the second shared secret are generated using a hash algorithm.

11. The method of claim 1, wherein the first shared secret is used to generate a first set of session keys to encrypt communications with the service provider and wherein the second shared secret is used to generate a second set of session keys to encrypt communications with the wireless device.

12. A wireless gateway authentication proxy, comprising:
a memory; and
a processor coupled to the memory, wherein the processor is configured to, based on instructions stored in the memory:
receive a first authentication credential from a wireless device;
map the first authentication credential to a second authentication credential;
transmit the second authentication credential to an authentication server;
receive a first authentication response from the authentication server;
generate a first shared secret and a second shared secret if the first authentication response indicates that authentication is successful; and
transmit a second authentication response to the wireless device;
wherein the first shared secret is used to set up a first secure channel for communications with a service provider over a wired network and the second shared secret is used to set up a second secure channel for communications with the wireless device.

13. The wireless gateway authentication proxy of claim 12, wherein the service provider is a PacketCable™ network, the authentication server is in the PacketCable™ network and is configured to authenticate the wireless device for both a PacketCable™ service and a WiFi™ service based on only the second authentication credential.

14. The wireless gateway authentication proxy of claim 12, wherein the processor is configured to, based on instructions stored in the memory, generate a first session key using the first shared secret to encrypt or decrypt communications with the service provider and generate a second session key using the second shared secret to encrypt or decrypt communications with the wireless device.

* * * * *